May 26, 1936.  C. B. BACKER  2,042,203
ELECTRIC HOT PLATE AND METHOD OF MAKING SAME
Filed Jan. 31, 1934
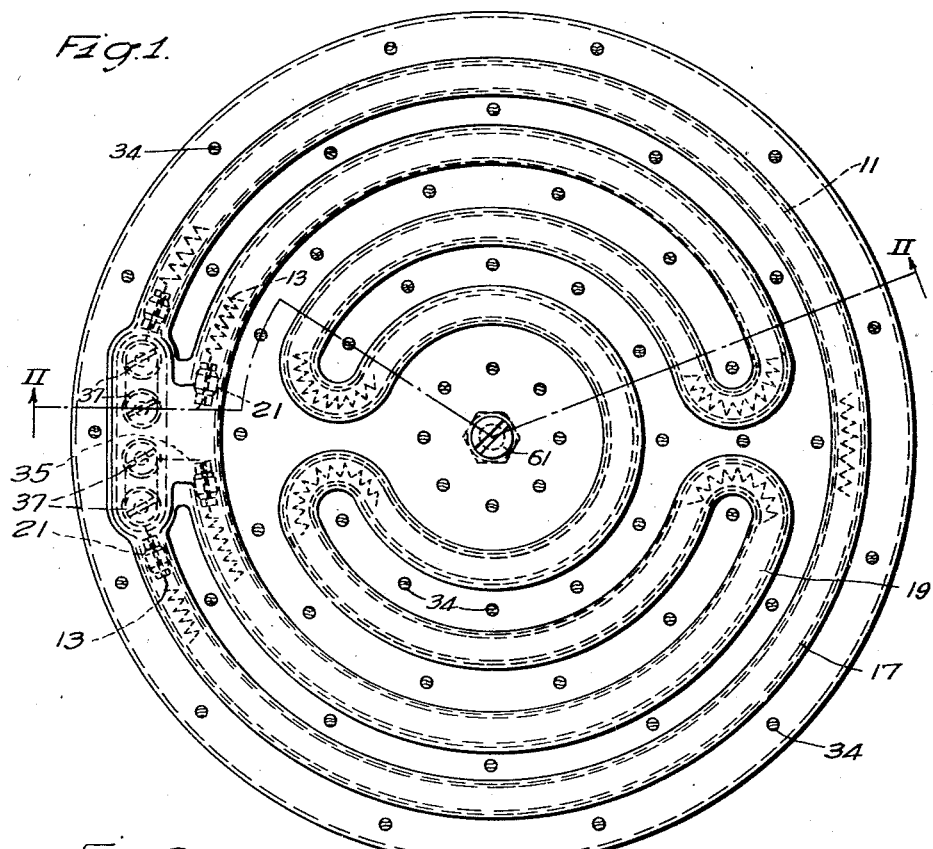
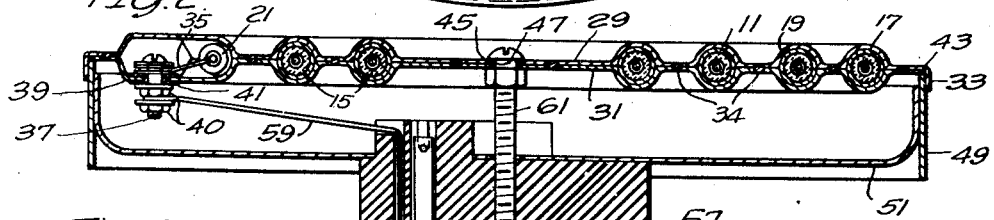
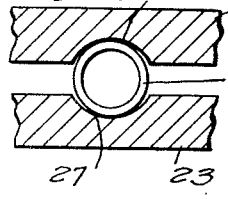
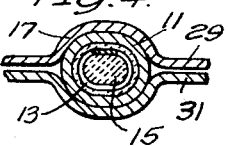
WITNESSES:
INVENTOR
Christian B. Backer.
BY
ATTORNEY Patented May 26, 1936

2,042,203

UNITED STATES PATENT OFFICE 2,042,203

ELECTRIC HOT PLATE AND METHOD OF MAKING SAME

Christian B. Backer, Ottawa, Ontario, Canada

Application January 31, 1934, Serial No. 709,155
In Canada February 14, 1933

14 Claims. (Cl. 219—37)

My invention relates to electric heating elements and more particularly to a light weight enclosed type of heating element.

An object of my invention is to provide an enclosed hot plate, the heating and supporting body of which is relatively light so that the plate will come up quickly to its maximum temperature.

Another object of my invention is to provide an enclosed hot plate which will operate at a relatively high temperature, that is, visible red heat, whereby it will transfer heat both by conduction and by radiation to an appliance being supported and heated thereby.

Another object of my invention is to provide an enclosed light weight grill element which may be operated at red heat.

Another object of my invention is to provide an enclosed room heater element which will not rust or scale when operated at visible red heat.

Another object of my invention is to provide a relatively simple, novel method of making such an encased boiling plate which will result in a highly efficient structure.

In practicing my invention, I provide one or more metal-encased tubular heating elements bent into any desired sinuous shape in a single plane, two relatively thin sheets of high-temperature resisting material, each having cooperating substantially semi-circular grooves therein of the same shape as the tubular elements, one of said plates being at each side of the tubular elements, the two plates having a central opening therein, both the inner and the outer peripheries of the plates being welded together or otherwise joined to provide a substantially air-tight high-temperature resisting casing for the metal-clad tubular heating elements. I provide further a plurality of terminal screws attached to the bottom sheet and suitably insulated therefrom, together with an annular supporting dished metal member located below the hot plate and having a terminal block of electric-insulating material operatively associated therewith. A single screw or bolt extends through the two plates, the dished metal member and the terminal block to hold all three elements in proper operative positions relative to each other.

I may provide also a novel method of slightly deforming the metal casing of the tubular heating element in order that a highly efficient heat-transmitting contact surface of the largest possible area shall be provided between the metal casing of the tubular heating element and the two enclosing thin-metal plates.

In the single sheet of drawing:

Figure 1 is a top plan view of a high temperature enclosed boiling plate embodying my invention;

Fig. 2 is a view in lateral section therethrough taken on the line II—II of Fig. 1;

Fig. 3 is a fragmentary view illustrating mechanism for slightly deforming the metal casing;

Fig. 4 is a fragmentary view showing another step in the assembly of the device;

Fig. 5 is a fragmentary view showing the assembled metal-clad tubular heating element located between two plates, Figs. 3, 4 and 5 being shown on a somewhat enlarged scale, and Fig. 6 is a fragmentary view of a modified means for ensuring an outer air tight joint.

My invention comprises more particularly the use of a metal-clad tubular heating element, and while I at present prefer to make this tubular heating element following the teachings of my United States Patent Re. 16,340, I desire it to be understood that I do not wish to be limited to such method, as I may use any other suitable or desirable method which will provide a tubular heater embodying an outer metal casing, a resistor element within the casing, which is preferably made of helical form, together with electric-insulating and heat-conducting insulation between the resistor and the metal casing.

A metal casing is shown more particularly at 11 in the several figures of the drawing which show a view in lateral section through the heating element. A helically wound resistor member or heating element 13 is of substantially smaller external diameter than the internal diameter of the metal tube 11, and I provide electric-insulating and heat-transmitting material 15 between the heating element 13 and the metal casing 11.

The material of which the metal casing 11 is made need not necessarily be a high temperature resisting metal or alloy for the reason that the metal casing is encased in an air-tight manner, as will be hereinafter set forth. However, the metal tube 11 is preferably made of some metal such as iron or steel in order that it may safely withstand the relatively high temperature of the resistor or heating element 13.

After the heating element has been manufactured in any desired or suitable manner, one or more pieces, each of proper length, are bent to sinuous shape which may, for instance, be those respectively shown in Fig. 1 of the drawing, in which the reference character 17 indicates an outer tubular heating element which may be bent to substantially circular shape, and the reference character 19 represents an inner tubular heating element which may include a plurality of arcuate portions.

I prefer to make the two units 17 and 19 of different lengths and of different heating capacities, the shorter element 17 having the lower heating capacity being located near the outer edge of the plate, as is shown in Fig. 1 of the drawing. When a three-heat control switch is used in connection with the two heating units 17 and 19, I prefer to so arrange the electrical connections between the control switch and the two heating units that the longer element 19, which, as hereinbefore stated, has the larger heat generating capacity, will be connected in circuit when the three heat or series parallel switch is set for the medium load, in which case usually only one of the two heating units is energized. Thus the percentage of the heating capacity of unit 19 may be from 60% to 70% of the total heating capacity, heating unit 17, therefore, providing from 40% to 30% of the total heating capacity. I have found that an arrangement of this kind gives a far more useful "medium load" for general cooking and heating purposes, particularly when a small vessel, pan, skillet or other utensil is located on the heating unit to be heated thereby. In case it is desired to use the heating unit for simmering purposes, the low capacity heating unit 17 is utilized, being located at the outer periphery of the cooking appliance, and its lower capacity together with its location will insure, in general, better simmering operation.

While I have shown a particular embodiment of an outer low-capacity heating unit, and an inner higher capacity unit with particular configurations for the respective tubular heating units, it is, of course, obvious that my invention is not restricted thereto and suitable changes may be made in either or both of the heating units without departing from the spirit and scope of my invention.

As was hereinbefore stated, any suitable or desired method of making the tubular metal-clad heating elements may be used so long as it provides an assembly of substantially the same kind as shown in the various figures of the drawing. At each end of each of the metal tubes I provide a suitable tubular electric-insulating refractory bushing 21 which may be held in place in the otherwise open end of the metal tube in any suitable or desired manner, and through which the end of the resistor wire 13 may extend for connection to terminals to be hereinafter described.

After having determined the proper length of each of the tubular heating units, I first bend them to substantially the desired shapes (that is, for the respective heating units) by any suitable or desired means which may either be by hand tools or by means of suitable forming machinery. After this I slightly deform or flatten the metal tube 11 by means of two cooperating dies, portions of which are shown at 23 and 25 in Fig. 3 of the drawing. I prefer to use metal tubes of initially substantially circular shape in cross-section and the grooves 27 in the respective die plates 23 and 25 are of slightly larger radius than the original radius of the outside of tube 11. When the two die plates 23 and 25 are moved toward each other, the metal tube 11 will be deformed to substantially oval shape, as is shown on an enlarged scale in Fig. 4 of the drawing, the shorter diameter of the oval extending in a direction at right angles to the plane of the tubular heating element.

The shape of the semi-circular grooves 27 in plates 23 and 25 is made exactly to the form which it is desired that the bent heating units will individually have and this step in the manufacture of the tubular heating units may be considered as one in which a final definite form of the tubular heating unit is given thereto longitudinally or axially of the convolutions thereof. This step makes it relatively easy to assemble the tubular heating units as will now be described.

A metal casing, substantially air-tight, is provided for the pre-shaped tubular heating units in the form of two substantially similar cooperating metal plates 29 and 31. I prefer to make these metal plates of relatively small thickness, say on the order of .028 inch to .035 inch, and I further prefer to make them of a high temperature resisting metal or alloy. Thus, I may use a nickel-chromium alloy, Monel metal, an iron-nickel-chromium alloy, or any one of the other high temperature resisting steel alloys now available. The two plates 29 and 31 are substantially alike except that I may provide plate 29, the upper plate, with a depending outer peripheral flange 33, as shown more particularly in Fig. 2 of the drawing.

Both of these plates are provided with grooves of approximately semi-cylindrical shape, or, specifically slightly oval shape to correspond to the shape of the deformed tube but of slightly lesser area, as shown in Fig. 4 of the drawing. Fig. 4 shows the initial positions of plates 29 and 31, one located at each side of the tubular heating unit or units, which tubular heating units have been deformed, as was hereinbefore described, to substantially oval shape. In practice, I may flatten the tube from .005 inch to .030 inch. This slight deformation is mainly for the purpose of ensuring that the upper and the lower surfaces of the bent tubular heating element will lie in individual planes parallel to each other, so that the bent tubes will fit into the semi-arcuate grooves in the plates 29 and 31 and have a good heat-conducting engagement therewith along the entire length of the tubes thereby providing a highly effiient heat-conducting path from the outer surface of the metal tube 11 to the enclosing plates.

I now weld the two sheets 29 and 31 together at a plurality of points 34, as has been indicated generally in Fig. 1 of the drawing and, while I have shown particular locations of these spot welds I do not desire to be limited thereto, as the main object is to force the two plates 29 and 31 together and to hold them in such engaging position substantially as shown in Fig. 5 of the drawing, to thereby tightly clamp the initially deformed metal tubular casing 11 for the purposes hereinbefore set forth.

The end portions 35 of the resistor heaters 13 extend outwardly through the refractory bushings 21 and to a corresponding plurality of terminal bolts 37, which extend through suitable openings in a depressed portion 39 of the lower plate 31. The respective ends of the portions 35 are electrically insulated in a suitable manner from the metal portion 39 by electric-insulating material 41 in the shape of mica washers, and are held tightly in electric conducting relation with the bolts 37 by a plurality of nuts 40. It is, of course, within the scope of my invention to use any suitable electric-insulating material with these terminal screws.

I now provide a continuous welding seam 43 near the periphery of plate 31 and between it and the adjacent portion of plate 29, and I provide further a continuous seam 45 at the inner or central opening 47 in order that the metal encased tubular heating units 17 and 19 may be located in a substantially air-tight metal casing. Instead of the welding seam 43 it is possible to fold the outer edge of plate 29 over the edge of plate 31 and thereby provide a substantially air-tight seam, as shown in Fig. 6. The plurality of spot welds 34 and the seams 43 and 45 or the turned-over edge of flange 33 provide a relatively stiff and rigid hot plate which can be loaded mechanically to relatively high values, as by placing heavy cooking utensils thereon, without appreciable or noticeable deformation.

Means for preventing excessive loss of heat in a downward direction may be provided in the shape of an annular metal skirt 49 having a member 51 also of metal and of dish-shape secured thereto inside of member 49, the outer diameter of the annulus 49 being such as to fit axially within the depending flange 33. While I have not shown any heat insulating material within the dished member 51, it is within the scope of my invention to use such a material in order to still further reduce heat flow in a downward direction.

A plurality of terminal pins 53 and 55 are provided which are located in a block 57 of refractory electric insulating material, the block 57 interfitting with the bottom of dished member 51 in any suitable or desired manner. The terminal screws 37 are provided with leads 59 to the respective terminal pins 53 and 55 in a manner well known in the art. I provide a single machine screw or bolt 61 which extends through opening 47, the dished member 51 and the block 57, a nut 63 being provided at the lower end of member 61 to hold all of these members in proper operative positions relatively to each other.

While I have illustrated and described means for preventing excessive loss of heat in a downward direction I may also dispense with the same where the hot plate is to be used as means for heating a grill, which use may be made of the heating element either by itself or at the same time that a cooking utensil is being heated at the top thereof. The connections to the terminals of the respective resistors would then be made in some other suitable manner, the leads 59 extending radially outwardly from the terminal screws 37, rather than radially inwardly and the hot plate being suitably supported in a manner well known in the art to permit of both surfaces thereof being used either sequentially or simultaneously.

I desire it to be further understood that while I have shown a substantially circular hot plate, I do not desire to restrict my invention to any definite shape or to any definite use of the same, as it is within the scope of my invention to make it of any shape in outline and to use it wherever a high temperature heating unit can be usefully and efficiently employed. It is obvious that the device embodying my invention provides a substantially enclosed heating unit, so that in case of a cooking utensil boiling over, no substantial damage will be done to any of the parts of the heating unit assembly.

I desire to point out further that one of the essential elements of my invention is the use of ordinary kinds of metal such as steel or copper for the tube 11 located within metal or alloy plates, which are able to withstand relatively high temperatures even operating up to red heat.

The relatively small mass of the assembly mean a relatively small amount of heat stored therein, and this insures a relatively quick heating up of the unit, thereby making it competitive with the ordinary gas flame as used in gas ranges.

When my improved hot plate is used to heat a cooking utensil placed on the top of the assembly, it is obvious that the very close engagement between the outer surface of the metal tube and the inner surface of the grooves in the respective plates will insure that the heat over the entire lateral periphery of the heating element will be conducted with a relatively small loss to the upper plate of the assembly and from there be conducted or radiated to the cooking utensil, thereby further adding to the efficiency of the device embodying my invention.

The use of a metal or alloy which will withstand relatively high operating temperatures without appreciable oxidation provides a heating unit which will not be subject to reduction of the thickness of the encasing plates, thereby providing a heating unit which will have a relatively long life even under adverse operating conditions.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. An electric hot plate adapted for high temperature use in air including a bent metal-encased heating element, a pair of substantially similar grooved metal plates located in opposed positions relatively to each other to receive and tightly hold the metal-encased heating element and to cover the same over its entire length and a continuous welding seam at the peripheries of the metal plates.

2. An electric hot plate adapted for use at red heat in air comprising a pair of opposed substantially similar metal plates having cooperating grooves therein, a tubular metal-encased heating element located in the grooves and covered by the plates over its entire length, means comprising spot welds between the two plates and on both sides of the grooves to hold the two plates together to tightly clamp the tubular heating element therebetween and a continuous welded seam at both the inner and the outer peripheries of the plates to provide an air tight casing for the heating element.

3. An electric hot plate comprising at least one metal clad tubular heating element bent to a predetermined shape in one plane, a pair of substantially similar thin-metal open-center plates, each having a groove therein to correspond to the shape of the tubular heating element and having a lateral section corresponding to but slightly less than one-half of the lateral section of the tubular heating element, and means including a plurality of spot welds between the two plates located on each side of the grooves for tightly clamping the tubular heating element between the plates.

4. A device as set forth in claim 3 in which the inner and outer peripheries of the two thin metal plates are seam welded to provide an air tight casing for the tubular heating element over its entire length.

5. A device as set forth in claim 3 which includes an outer edge portion of one plate return-bent over the outer edge portion of the other plate to provide an air tight casing over the entire length of the tubular heating element.

6. An electric hot plate comprising a metal-clad tubular heating element bent to a predetermined shape in one plane, and means for holding the tubular heating element in substantially said plane and for protecting it against oxidation at high operating temperatures, comprising two substantially similar opposed open-center thin-metal plates of high temperature resisting material each having a complementary semi-arcuate groove therein cooperating to receive the tubular heating element therein, spot welds securing the two plates together at a plurality of points at both sides of the groove and continuous welded seams around the inner and the outer periphery of the two plates.

7. An electric hot plate including a metal-clad tubular heating element bent to a predetermined shape in one plane, an air tight casing for the tubular heating element comprising a pair of open-center metal-plates having semi-arcuate grooves therein located in opposed positions relatively to each other, spot welds between the opposed plates to hold them together and tightly clamp the tubular heating element therebetween, welded seams at the inner and the outer peripheries of the two plates to provide an air tight casing, a support for the two plates, of dish-shape, below the plates, a terminal block below and interfitting with the support, and a single means extending through the two plates, the support and the terminal block for holding them in proper operative positions relatively to each other.

8. The method of making an electric hot plate which includes the steps of deforming a metal-clad tubular heating element from a substantially circular cross-section to a slightly oval shape, locating the deformed tubular heating element between two opposed metal plates having cooperating arcuate grooves therein of substantially the same shape as the deformed tubular heating element, and then permanently securing the two plates together at both sides of the groove.

9. The method of making an electric hot plate which includes the steps of deforming a metal clad tubular heating element from a substantially circular cross-section to a slightly oval shape, locating the tubular heating element between two opposed open-center metal plates having cooperating approximately semi-circular grooves therein of a shape to fit closely the deformed tubular heating element, then permanently securing the two plates together at both sides of the groove, and then disposing both the inner and the outer peripheries of the two plates to form a substantially air tight enclosure for the tubular heating element.

10. The method of making an electric hot plate which includes the steps of bending a metal-clad tubular heating element of substantially circular cross-section into sinuous shape in a plane, deforming the metal casing to a slightly oval cross-section, the shorter dimension of the oval extending laterally of the plane, tightly clamping the shaped and deformed tubular heating element between two oppositely grooved metal plates, the depth of the two grooves laterally of the plates being slightly less than the lateral depth of the metal tube and then permanently securing the two plates together.

11. An electric hot plate comprising a metal clad tubular heating element having a sinuous shape in a plane, and means for tightly clamping and holding said tubular heating element in a substantially air tight manner, said means including a pair of open-center oppositely grooved thin metal plates of high-temperature resisting metal, the depth of the two cooperating grooves being slightly less than the lateral dimension of the metal casing of the tubular heating element, means securing the two plates together adjacent to the grooves and means uniting the inner and the outer peripheries respectively of the two plates 12. An electric hot plate comprising a metal-encased tubular heating element bent to sinuous shape in one plane, the lateral section of the metal casing being oval with the larger diameter extending in said plane, a pair of complementary substantially similar plates of a high temperature resisting metal, each having a groove therein having a lateral section corresponding to slightly less than one-half of that of the tubular heating element, a plurality of spot welds holding the two plates tightly against the tubular heating element over its entire length and a welded seam at the periphery of the two plates to cooperate therewith to provide an air tight casing for the tubular heating element.

13. An electric hot plate adapted for high-temperature operation in air including a metal-clad tubular heating element bent to a predetermined shape, an air tight casing for the tubular heating element comprising a pair of high-temperature resisting metal plates having grooves therein corresponding to said shape and located in opposed positions relatively to each other, spot welds between the opposed plates to hold them together and tightly clamp the tubular heating element therebetween, and a welded seam at the outer periphery of the plates to provide an air tight casing.

14. A flat-type electric hot plate adapted for high-temperature operation in air and to contact with the bottoms of cooking utensils, including a metal-clad tubular heating element bent to a predetermined shape in one plane, an air tight casing for the tubular heating element comprising a pair of high-temperature resisting metal plates having grooves therein corresponding to said shape and located in opposed positions relatively to each other, spot welds between the opposed plates to hold them together and tightly clamp the tubular heating element therebetween, and a welded seam at the outer periphery of the plates to provide an air tight casing.

CHRISTIAN B. BACKER.